Patented June 15, 1954

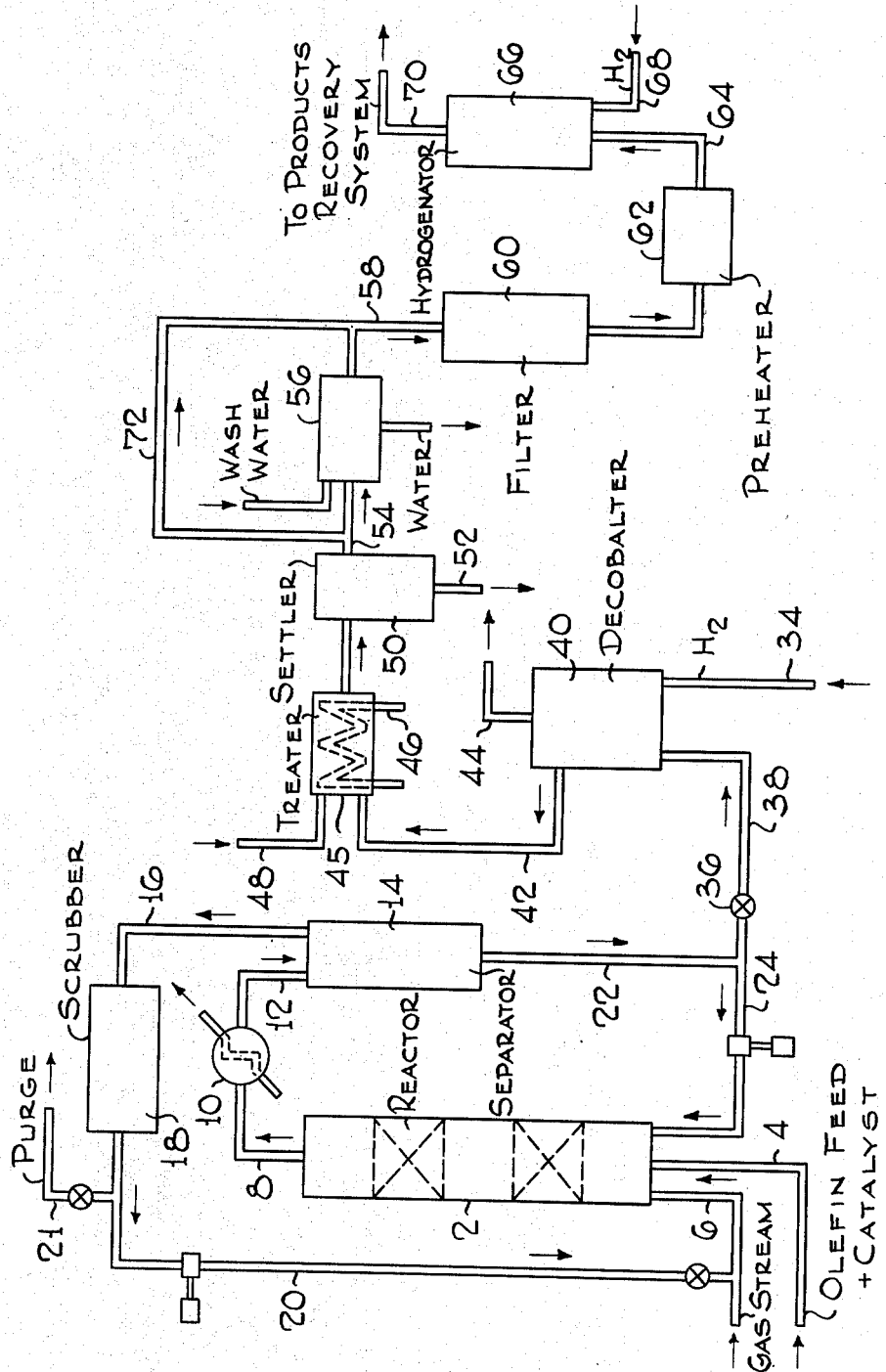

2,681,368

UNITED STATES PATENT OFFICE 2,681,368

REMOVAL OF COBALT AND IRON FROM OXO ALDEHYDES

Cecil H. Hale, Baton Rouge, La., assignor to Standard Oil Development Company, a corporation of Delaware Application October 21, 1949, Serial No. 122,624

4 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for removing catalytic material from the reaction products resulting from the interaction of olefinic compounds with carbon monoxide and hydrogen.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch chained olefins and diolefins such as propylene, butylene, pentene, hexene, heptene, butadiene, pentadiene, styrene, olefin polymers such as di and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the process is usually added in the form of salts of the catalytically active metal with high molecular weight acids, such as stearic, oleic, palmetic, naphthenic, etc. Thus, suitable catalysts are, for example, cobalt oleate or naphthenate, or iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general about 2500 to 15,000 cubic feet of $H_2+CO$ per barrel of olefin feed is employed.

At the end of the first stage, when the desired conversion of olefins to oxygenated compounds has been effected, the product and the unreacted material are generally withdrawn to a catalyst removal zone, where dissolved catalyst is removed from the mixture, and it is to this stage that the present invention applies.

One of the major problems involved in the aldehyde synthesis reaction is the fact that the catalyst metal and other carbonyl forming metals such as cobalt, iron, etc., though added as organic salts to the reaction zone, react with carbon monoxide under the synthesis conditions to form metal carbonyls. There is basis for the belief that the metal carbonyl or hydrocarbonyl is the active form of the catalyst. The carbonyl remaining dissolved in the reaction product from the primary carbonylation stage can thus be removed in an intermediate catalyst removal stage and this is customarily done by heating the primary reaction product in a suitable chamber or tower with or without packing at atmospheric or superatmospheric pressures and usually in the presence of a slow stream of an inert stripping gas such as hydrogen in order to remove overhead the carbon monoxide resulting from the decomposition of the metal carbonyl to protect the nickel or cobalt or other carbonyl forming metal employed in the subsequent high pressure hydrogenation stage.

Furthermore, it is essential to remove from the aldehyde product substantially all metallic compounds, which are dissolved therein, because if these are not removed they will deposit in the coils or on the catalyst in the subsequent hydrogenation reactor resulting in plugging of the former and deactivation of the latter. Accordingly it is highly desirable to keep the concentration of metal in the product from the decobalting or catalyst removal zone less than 0.005%. These metals may be present in solution, not only as the carbonyl as noted above, but also, the soaps initially employed to introduce cobalt into the primary reaction zone, or as salts of formic or other acids resulting as secondary reaction product, or as complexes coordinated with aldehydes, glycols or other constituents in the product.

Though the heat-treating process, in the presence of an inert gas, of the aldehyde product is quite satisfactory as far as decomposing the bulk of the carbonyl is concerned, this treatment is not equally effective in decomposing cobalt compounds and complexes of other composition. Furthermore, small quantities of other metallic carbonyls, in particular iron carbonyl, are not completely decomposed by the heat treatment. Iron carbonyl may arise from various sources, such as from the interaction of CO at high pressures with iron-containing impurities in the feed, reaction of carbon monoxide with the walls of the reactor and transfer lines, etc. Iron carbonyl is considerably more stable than the cobalt analogue, and is only partially decomposed into the metal and CO under the decobalting conditions in the catalyst removal zone.

It is one of the purposes of the present invention to provide improved means for removing cobalt and other carbonyl-forming metals from the carbonylation reaction product and to prevent plugging of reactor lines and deactivation of the hydrogenation catalyst.

Another purpose of the invention is to provide an efficient means for removing substantially completely metal compounds and complexes from the aldehyde stream, which compounds and complexes were not decomposed by the heat-treating process.

Other and further objects and advantages of the invention will become apparent from the description hereinafter.

It has now been found that these objects may readily be accomplished and a reaction product obtained substantially free of dissolved metal by treating the primary aldehyde product with an aqueous solution of a complexing agent. This treatment preferably follows the decobalting operation in the catalyst removal stage, though if desired, it may be concurrent, or under certain circumstances, even replace that step. Preferably, however, the aldehyde product from which the bulk of the dissolved metal has been removed by heat treatment and stripping, is treated in an extraction zone with an aqueous solution of material which forms complexes with iron and cobalt. Such complexing agents are for instance, organic compounds containing two or more functional groups such as hydroxyl or carboxyl; tartaric or lactic acid are examples. Certain organic compounds with labile hydrogen, such as acetylacetone, which tend to form chelation complexes are also suitable. Among inorganic compounds, phosphates and fluorides, etc. may be employed. Not only are these agents more effective for removing dissolved cobalt and iron from the aldehyde product than washing or extracting with water alone, but also, the dissolved complexing agent effectively retards emulsification during extraction as well.

The present invention and its application will best be understood from the more detailed description hereinafter, wherein reference will be made to the accompanying drawing, which is a schematic representation of a system suitable for carrying out a preferred embodiment of the invention. Referring now to the figure, an olefinic compound having one carbon atom less than the number of carbon atoms in the desired resulting oxygenated compound is fed through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprise but a single packed zone, or even if desired, may contain no packing.

The olefinic feed preferably contains dissolved therein 1–3% by weight of cobalt oleate based on the olefin. Other compounds of cobalt or of iron, or their mixtures, may also be used. Simultaneously, a gas mixture comprising $H_2$ and CO in the approximately equal ratio of $H_2$ to CO is supplied through line 6 to primary reactor 2 and flows concurrently through reactor 2 with said olefin feed. Reactor 2 is preferably operated at a pressure of about 2500–3500 p. s. i. g. and at a temperature of about 250°–450° F., depending upon the olefin feed and other reaction conditions. The rate of flow of synthesis gases and olefin through reactor 2 is so regulated that the desired conversion level of the olefin is obtained.

Liquid oxygenated reaction products containing catalyst in solution and unreacted synthesis gases are withdrawn overhead from an upper portion of high pressure reactor 2 and are transferred through line 8 to cooler 10 in which any conventional means of cooling are employed, and from there via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 or purged via line 21.

A stream of primary reaction product containing dissolved therein relatively high concentration of cobalt carbonyl and probably some iron carbonyl is withdrawn from separator 14 through line 22. A portion of said withdrawn stream may be recycled if desired, to reactor 2 via line 24 to aid in the cooling and maintenance of temperature control of the primary carbonylation stage. The balance of the primary reaction product, which may comprise unreacted olefin, secondary reaction products, and dissolved catalyst and metal carbonyls and salts as well as desired aldehydes, is withdrawn through pressure release valve 36 and line 38 and passed to catalyst removal or decobalting zone 40. Within decobalter 40, the soluble cobalt carbonyl, and iron carbonyl formed from sources enumerated above is removed from the aldehyde produced prior to high pressure hydrogenation in order to prevent its decomposition in the hydrogenation stage with consequent reactor plugging and hydrogenation catalyst with metallic cobalt or iron. Carbonyl decomposition may be obtained by heating the aldehyde product by such means as closed steam coils to 300–350° F. at a pressure just high enough to keep the components in the liquid phase. Pressures in the neighborhood of 100–150 p. s. i. g. are preferred. The product containing catalyst in solution is injected into zone 40 through line 38 at a feed rate of about 2–4 v./v./hr. If desired, stripping gas, such as hydrogen, may be added through line 34 to aid in decreasing the CO partial pressure. Also, if desired, it may be advantageous to operate with two or more decobalters, switching the stream from one to another as the one in service accumulates excessive quantities of cobalt metal. The gas stream comprising stripping gas and CO may be removed overhead from 40 through line 44 and used as desired.

The liquid aldehyde product now freed of the bulk of dissolved metal carbonyls but which may still contain in solution cobalt and/or iron compounds to the extent of 0.05% or more as metal is withdrawn from catalyst removal zone 40 through line 42 and passed to treating zone 45. This latter may be a vessel equipped with closed or open steam coils 46 and preferably with means of agitation and, if desired, reflux. An aqueous solution of a complexing agent, as sodium or ammonium tartrate is admitted through line 48 in amounts about 0.01 to 0.2 volumes solution per volume aldehyde product. The tartrate concentration is preferably about 10% though it may vary if desired from about 0.5 to 20%. The rate of complex agent addition is rapid, and an effective contact time of about 30 to 360 seconds is maintained. If desired, agitation may be maintained at reflux conditions, though this is not always necessary, room temperatures being sometimes sufficient to form the complexes with the dissolved metal.

The resulting mixture is then passed to settling zone 50. The lower aqueous layer, consisting of the iron and cobalt complexes, may be withdrawn through line 52 and discarded or, if desired, the complexing agent may be recovered and regenerated. The upper layer, now substantially free of dissolved iron and cobalt, may be passed through line 54 to washing zone 56, wherein it may be thoroughly agitated with water to remove any treating agent, the upper product layer then withdrawn through line 58 and passed to filter 60, if desired. However, both the final washing step and the filtration step may under some circumstances be omitted.

The filtered solution is withdrawn from filter 60, passed through preheater 62 to the bottom portion of hydrogenation reactor 66 via line 64. Simultaneously, hydrogen is supplied to hydrogenation reactor 66 through line 68 in proportions sufficient to convert aldehydes into the corresponding alcohols. Reactor 66 may contain a mass of any conventional hydrogenation catalyst, such as nickel, copper chromite active catalysts such as tungsten, nickel or molybdenum sulfides preferably supported on carriers, such as charcoal, pumice, and the like. Reactor 66 is preferably operated at a temperature of about 400°–500° F., pressure of about 2500–3500 p. s. i. g., and liquid feed rate of about 0.5–0.8 v./v./hr.

The products from the hydrogenation reactor and unreacted hydrogen may be withdrawn overhead through line 70 and passed to the products recovery system and alcohols recovered all in a manner known per se.

The invention admits of numerous modifications apparent to those skilled in the art. Thus, mention has not been made of various accessory equipments which normally are used in a commercial plant. Thus, in the interest of good heat economy, various heat exchangers and economizers would be employed to utilize whatever heat is available in the most efficient manner and, in order to control the process, pumps, compressors, valves, flow meters, etc. would be included in the equipment.

As examples of complexing agents, suitable for the removal of dissolved iron and cobalt from the aldehyde product, the following by no means all-inclusive list may be cited: Ammonium tartrate, sodium tartrate, sodium potassium tartrate, ammonium citrate, sodium citrate, potassium citrate, sodium oxalate, etc.

The invention may be further illustrated by the following examples which point up the advantages of operating in accordance with the present invention.

Example I

Primary reaction product from a semi-commercial plant, said product comprising principally octyl aldehydes prepared from a $C_7$ olefin cut, and which had been passed through a catalyst removal zone under catalyst removal conditions, i. e., heating for a period of about 1 hour with a closed steam coil in the presence of a slow stream of $H_2$ at a temperature of about 300° F., was found to contain in solution 163 parts per million of cobalt. This product was then treated (a) with water, and (b) with 10% tartaric acid neutralized with $NH_3$, at 85° F. for ½ minute.

| Extractant | Vol. Ratio, Product/Extractant | P. P. M. Cobalt |
|---|---|---|
| None | | 163 |
| $H_2O$ | 1 | 44 |
| $H_2O$ | 20 | 75 |
| 10% Tartaric Acid Neutralized with $NH_3$ | 100 | 8 |
| Do | 10 | 8 |
| Do | 10 | 12 |
| 0.5% Tartaric Acid Neutralized with $NH_3$ | 2 | 28 |

These data clearly indicate the large-scale improvement obtained by treating the crude aldehyde product with the complexing agent. Even when the latter is present only in small quantities, the results are far superior to using a water wash.

Example II

Crude primary reaction product, decobalted as above, was found to contain 0.042% by weight of cobalt. The material was treated for 15 seconds with 1) 10 volume percent of water, and 2) 10 volume percent of a 10% aqueous solution of sodium tartrate, both at 85° F. Less emulsification was observed in 2). The removal of the dissolved cobalt is shown in the following tabulation.

| Treatment | P. P. M. Cobalt |
|---|---|
| None | 420 |
| $H_2O$ | 140 |
| 10% sodium tartrate | 46 |

The treating may be carried out at temperatures from about 30° to about 250° F. at pressures ranging from atmospheric to superatmospheric, depending upon the type of product treated.

The foregoing description and examples, though illustrating specific applications and results of the invention, are not intended to exclude modifications obvious to those skilled in the art, and which are within the scope of the invention.

What is claimed is:

1. In a carbonylation process wherein carbon compounds containing olefinic double bonds are contacted in an initial reaction zone with carbon monoxide and hydrogen in the presence of a cobalt carbonylation catalyst under conditions to produce reaction products comprising aldehydes containing at least one more carbon atom than said olefinic compounds, and wherein metal compounds comprising metal carbonyls are dissolved in said reaction products, and the solution comprising said reaction products and dissolved metal compounds is transferred to a catalyst removal zone wherein the bulk of the metal carbonyls are decomposed to the metal under the influence of temperatures and pressures conducive to the decomposition of cobalt carbonyl and deposition of solid catalyst metal in said catalyst removal zone, and wherein a liquid effluent comprising said aldehydes, as well as a minor portion of undecomposed dissolved metal compounds is withdrawn from said last-named zone, the step of removing dissolved metal compounds from said effluent which comprises contacting the latter with an aqueous solution of a derivative of a hydroxy carboxylic acid, thereby extracting said dissolved metal from said aldehyde product in the form of a complex of said metal dissolved in said aqueous solution, separating aqueous from a non-aqueous phase, and recovering from said treating zone an aldehyde product substantially free of dissolved carbonyl-forming metal contaminants.

2. The process of claim 1 wherein said acid is a tartaric acid.

3. The process of claim 2 wherein said agent is ammonium tartrate.

4. The process of claim 2 wherein said agent is sodium tartrate.

References Cited in the file of this patent

Delsal, J. L. (French) Journal de Chimie physique, 35 page 324 (1938).

Fiat Final Report No. 1000 PB-81383, Dec. 26, 1947, pgs. 11 to 19, 28 and 29).